April 4, 1944.  R. H. REED  2,345,715
AGRICULTURAL APPARATUS
Filed July 30, 1940  3 Sheets-Sheet 2
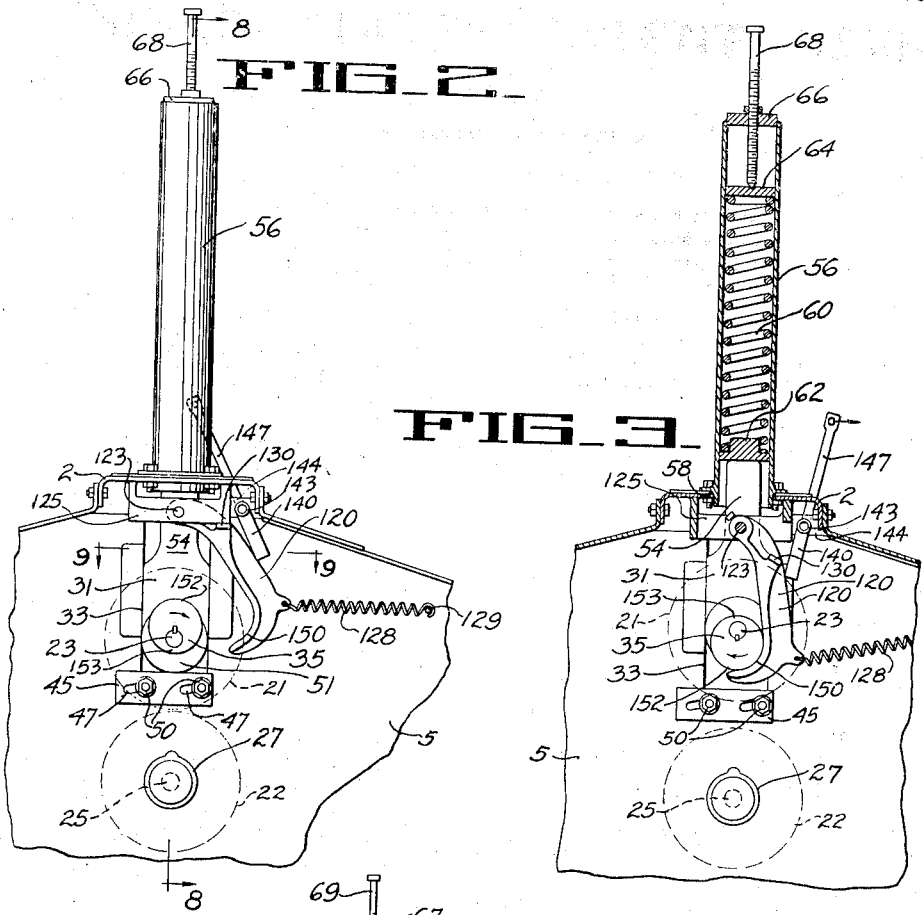
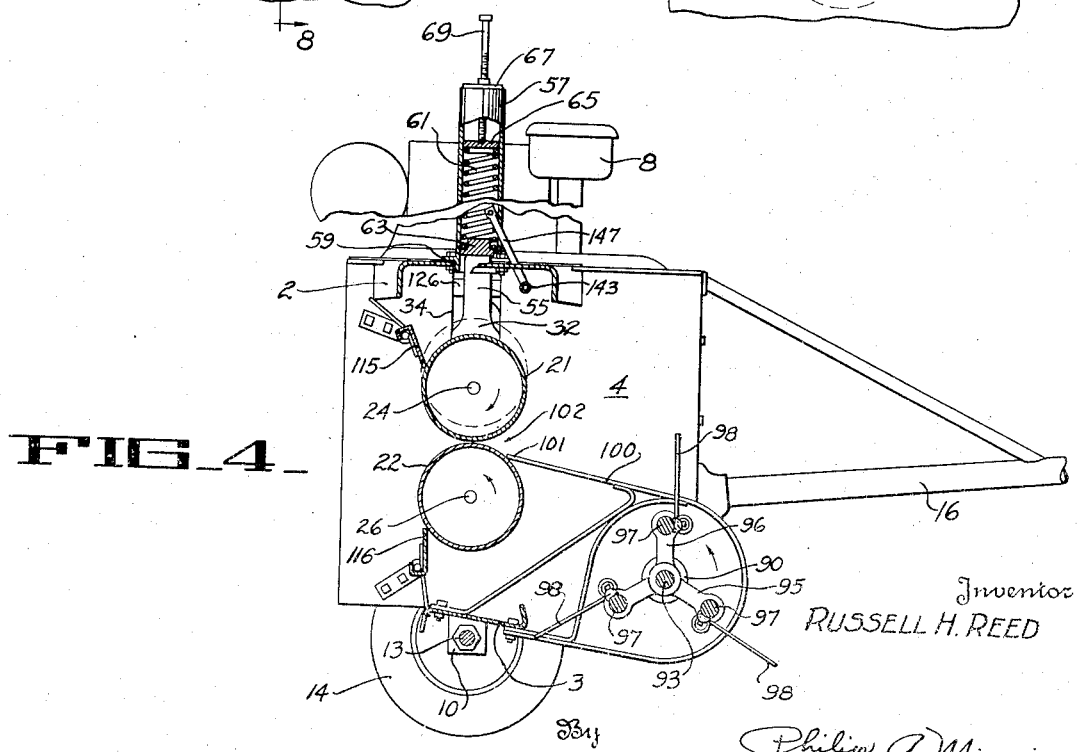
Inventor
RUSSELL H. REED
By Philip A. Minnis
Attorney

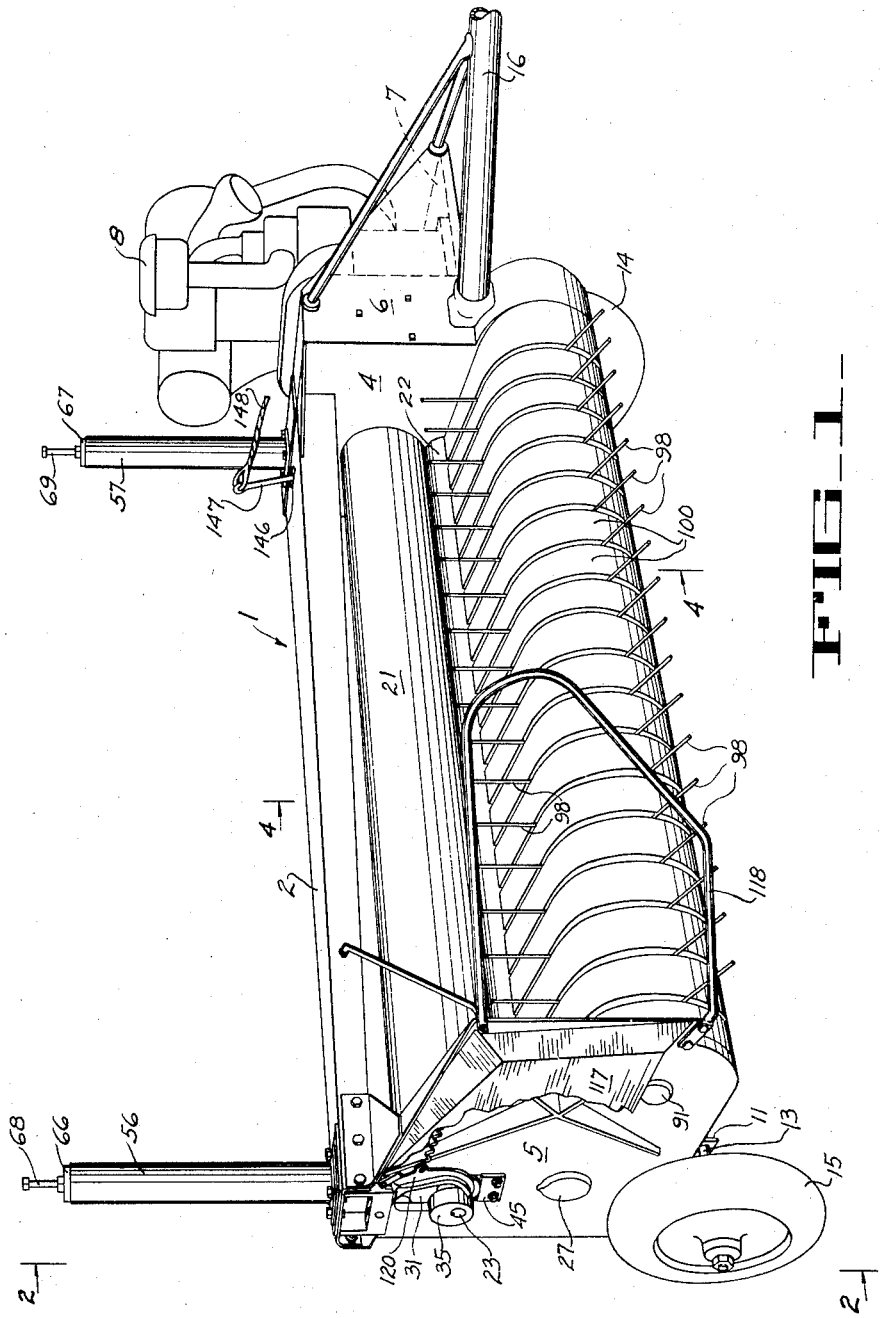

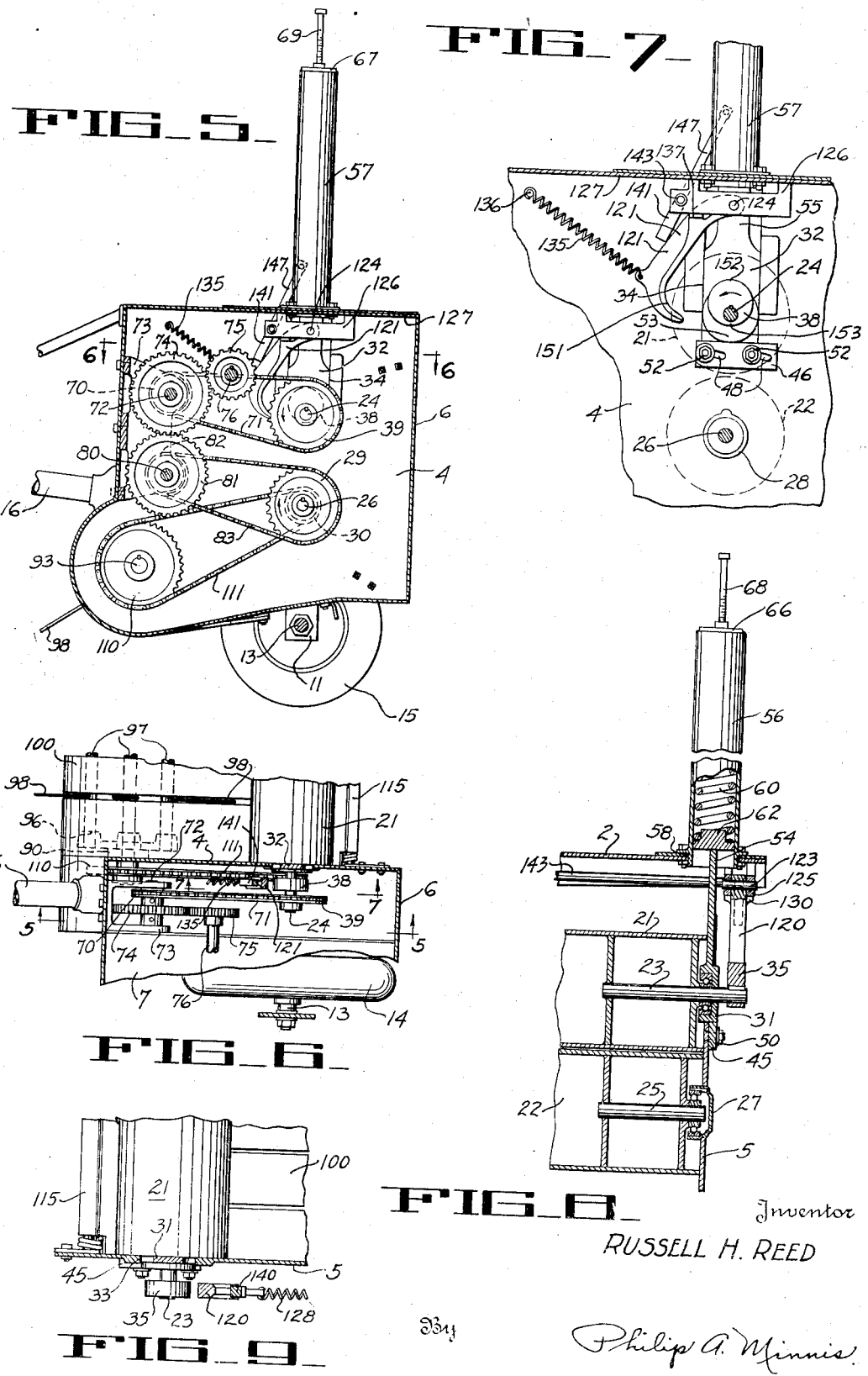

Patented Apr. 4, 1944

2,345,715

UNITED STATES PATENT OFFICE 2,345,715

AGRICULTURAL APPARATUS

Russell H. Reed, Champaign, Ill., assignor to Food Machinery Corporation, San Jose, Calif., a corporation of Delaware Application July 30, 1940, Serial No. 348,407

5 Claims. (Cl. 83—12)

This invention relates to machines for treating alfalfa hay or the like by cracking the stems of the plants to accelerate drying of the same during harvesting thereof.

In machines of the character referred to herein it has been customary to employ cooperating contacting presser rolls for cracking the stems of the plants and to mount one of the rolls yieldably in order to accommodate varying quantities of alfalfa between the presser rolls.

However, it has been impracticable to employ contacting metal rolls because the same chew up the plants and the costs of machining these rolls to assure a proper contact thereof have been prohibitive. It has therefore been proposed heretofore to cover one or both presser rolls with rubber to prevent the chewing up of the plants. However, in practice the employment of either one or two rubber-covered rolls has not proven very satisfactory because considerable portions of the leaves of the plants are broken from the stems due to the great pressure between the rolls which must be maintained to efficiently crack the stems of the plants.

Other objectionable factors in machines of this type have been the high cost of production of these rolls and the expense of upkeep of the same due to the wear of the rubber rolls which necessitates frequent replacement thereof.

Another disadvantage inherent in alfalfa treating machines of the type referred to herein has been the tendency of the presser rolls to become clogged upon accumulation of large quantities of plant material in front of the same which cannot force the rolls apart sufficiently to enter therebetween. This results in an improper operation of the machine and necessitates frequent stopping thereof to permit manual removal of the accumulation of the plants in front of the presser rolls.

This clogging is often caused by the obstruction of the presser rolls by foreign objects such as corn stalks, corn cobs or other portions of plants previously raised on the field.

The breaking of the leafy portions of the plants from the stems produces considerable quantities of finely broken plant material which cannot be recovered from the field after drying of the hay. This leafy material is the best part of the alfalfa hay, as it has the highest food value and finest color and aroma of the plant, and its loss is therefore undesirable and reduces the commercial value of the hay.

It is therefore an object of the present invention to provide a machine for treating alfalfa hay or the like to accelerate the drying thereof without breaking the leafy portions of the plants from the stems.

Another object is to provide a machine for treating alfalfa hay which comprises cooperating spaced metal presser rolls for cracking the stems of the plants without breaking the leafy portions of the plants from the stems.

Another object is to provide means for automatically increasing the spacing between the presser rolls during the operation of the machine to prevent clogging of the same upon accumulation of large quantities of plant material in front of the rolls or obstruction thereof by foreign objects.

Another object is to provide a pick-up mechanism closely positioned with respect to the presser rolls of the machine for elevating the cut plants from the field and for introducing the same between the spaced presser rolls.

Other and further objects and advantages of the present invention will become apparent from the following description and drawings, in which:

Fig. 1 is a perspective view of the machine of the present invention.

Fig. 2 is an elevational view of a portion of a side plate of the machine looking in the direction 2—2 of Fig. 1, illustrating the mechanism for raising the upper presser roll in inoperative position.

Fig. 3 is a view similar to Fig. 2 illustrating the mechanism for raising the upper presser roll in operative position, certain parts being shown in section.

Fig. 4 is a cross section of the machine shown in Fig. 1 taken along lines 4—4 thereof, certain parts being broken away.

Fig. 5 is a transverse section through the gear housing at the engine side of the machine taken along lines 5—5 of Fig. 6.

Fig. 6 is a horizontal section of Fig. 5 taken along lines 6—6 thereof, certain portions being broken away.

Fig. 7 is a section of a portion of Fig. 6 taken along lines 7—7 thereof.

Fig. 8 is a vertical section of Fig. 2 taken along lines 8—8 thereof, certain parts being shown in elevation.

Fig. 9 illustrates a horizontal section of Fig. 2 taken along lines 9—9 thereof.

Referring now to the drawings, and especially to Figs. 1 and 4, 1 illustrates the frame structure of the machine, which consists of longitudinally extending upper and lower frame portions 2 and 3 provided at their ends with side plates 4 and 5, respectively. Attached to the side plate 4 of the frame structure of the machine is a gear housing 6 provided with a table 7 (see Fig. 6) upon which an engine 8 is mounted in any convenient manner (see Fig. 1).

Secured to the side plates 4 and 5 of the frame structure 1 by means of brackets 10 and 11 is an axle 13 upon which rubber-tired wheels 14 and 15 are rotatably mounted in any convenient manner. Fixed to one side of the gear housing 6 at the front end of the machine is a draw bar 16, only a portion of which has been shown in Fig. 1, for connecting the machine behind a mowing machine. Interposed between the side plates 4 and 5 and extending longitudinally within the frame structure 1 are metal presser rolls 21 and 22 provided at their free ends with stud shafts 23, 24 and 25, 26, respectively, fixed thereto in any convenient manner. The stud shaft 25 of the presser roll 22 is rotatably mounted within a bearing 27 secured to the side plate 5 of the machine (see Figs. 1, 2, 3 and 8) while the stud shaft 26 of said presser roll is rotatably mounted within a bearing 28 secured to the side plate 4 of the machine. The stud shaft 26 extends through the bearing 28 into the gear housing 6 and carries sprocket wheels 29 and 30 keyed thereto.

The stud shafts 23 and 24 of the upper presser roll 21 are rotatably mounted within bearing members 31 and 32 which are slidably supported within vertical slots 33 and 34 of the side plates 5 and 4, respectively. The stud shaft 23 of the presser roll 21 extends through the bearing 31 and carries a rotary cam 35 which is keyed thereto. The stud shaft 24 extends through bearing 32 into the gear housing 6 and carries a rotary cam 38 and a sprocket wheel 39 keyed thereto.

Positioned adjacent the lower ends of the vertical slots 33 and 34 are supporting plates 45 and 46 provided with inclined slots 47 and 48, respectively. The supporting plate 47 is adjustably secured to the side plate 5 by means of cap screws 50 which extend through the inclined slots 47 previously referred to. The supporting plate 45 is adapted to engage the lower end 51 of the bearing 31 to support the same in a predetermined position within the slot 33 of the side plate 5.

In a similar manner, the supporting plate 46 is adjustably secured to the side plate 4 by means of cap screws 52 (see Fig. 7) extending through the inclined slots 48 of the plate 46. The supporting plate 46 is adapted to engage the lower end 53 of the bearing 32 for supporting the same in a predetermined position within the slot 34 of the side plate 4 of the frame structure of the machine.

The presser roll 21 is yieldably supported within the slots 33 and 34 of the side plates 4 and 5 by means of the bearings 31 and 32, which are each provided with upwardly extending portions 54 and 55 projecting into the open ends of tubular spring housings 56 and 57, respectively, secured to the upper frame structure 2 of the machine and extending through openings 58 and 59 thereof. Mounted within the spring housings 56 and 57 are coil springs 60 and 61 (see Figs. 3 and 4) which engage presser plates 62 and 63 freely movable within the spring housings and adapted to engage the upper free ends of the bearing portions 54 and 55, respectively. The upper ends of the coil springs 60 and 61 are engaged by plates 64 and 65 which are freely movable within their respective spring housings 56 and 57. Threaded within top plates 66 and 67 of the spring housings 56 and 57 and extending therethrough for engagement with the plates 64 and 65 are adjustment screws 68 and 69, as will be best seen from Figs. 3 and 4, so that upon rotation of the adjustment screws 68 and 69 in one or the other direction the compression of the coil springs 60 and 61 may be increased or decreased as desired.

From the above it will therefore be seen that the bearing members 31 and 32 of the stud shafts 23 and 24 are normally held in their lowermost position by the action of the coil springs 60 and 61, so that they are normally in engagement with and supported by the supporting plates 45 and 46, respectively. The supporting plates are adjusted in such a manner with respect to the side plates 4 and 5 that the presser roll 21 is held in a predetermined spaced relation with respect to the lower presser roll 22 but is free to yield in an upward direction against the force of the springs 60 and 61 acting upon the bearings 31 and 32.

The force of the springs 60 and 61 acting upon the bearings of the presser roll 21 is so adjusted that the stems of the plants are properly cracked between the presser rolls but are not completely crushed therebetween.

By loosening the cap screws 50 and 52 and shifting the supporting plates 45 and 46 in lateral directions with respect to the side plates 5 and 4, the supporting plates 45 and 46 may be raised or lowered with respect thereto so that the spacing between the upper and lower presser rolls may be varied in any desired manner.

It has been found in practice that for alfalfa a spacing of from one-sixteenth to one-eighth of an inch between the metal presser rolls 21 and 22 will be satisfactory for proper operation to obtain the desired cracking of the stems without excessive breaking off of the leafy portions. However, it will be understood that this spacing may be varied in accordance with the average thickness of the stems of the plants to be treated, as, for example, where the machine is to be used on other kinds of legume hay crops.

The sprocket wheel 39 which is keyed upon the stud shaft 24 previously referred to is rotatably interconnected with a sprocket wheel 70 by means of a sprocket chain 71 (see Figs. 5 and 6). The sprocket wheel 70 is fixed upon a shaft 72 rotatably mounted within a bearing bracket 73 secured to the gear housing 6 of the machine in any convenient manner (see Fig. 5). Also keyed to the shaft 72 is a pinion 74 which intermeshes with a drive pinion 75 fixed upon the drive shaft 76 of the engine 8, so that upon operation of the engine 8 and rotation of the drive shaft 76 the upper presser roll 21 will be rotated in a direction as indicated in Fig. 5.

Rotatably positioned within the bearing bracket 73 above referred to is a second shaft 80 upon which a pinion 81 is fixed for rotation therewith in intermeshing relation with the pinion 74. Also keyed to the shaft 80 is a sprocket wheel 82 which is operatively connected with the sprocket wheel 29 by means of a sprocket chain 83 so that upon rotation of the upper presser roll in a counter-clockwise direction (see Fig. 5) the lower presser roll will be rotated in an opposite or clockwise direction.

Rotatably mounted within bearings 90 and 91 of the side plates 4 and 5 (see Figs. 1 and 4) is a shaft 93, upon which a reel structure 95 is mounted for rotation therewith. The reel structure 95 extends longitudinally across the front end of the machine between the side plates 4 and 5 of the frame structure 1. This reel structure consists of a plurality of spider members 96, only one of which has been shown in Figs. 4 and 6 and rods 97 secured thereto and extending therebetween. Fixed to the rods 97 at spaced intervals are a plurality of resilient pick-up fingers 98 which extend beyond the outer surfaces of a plurality of curved stripper guides 100 positioned intermediate the same and secured to the lower frame structure 3 at the front end of the machine in any convenient manner.

The free end of the shaft 93 adjacent the side plate 4 extends through the bearing 90 into the gear housing 6 and carries a sprocket wheel 110 keyed thereto which is operatively connected with the sprocket wheel 30, previously referred to, by means of a sprocket chain 111, so that upon rotation of the stud shaft 26 and lower presser roll 22 the reel structure 95 is rotated in a direction as indicated in Fig. 4.

The reel structure 95 is arranged in close relation to the presser rolls 21 and 22 (see Fig. 4) and the upper rear ends 101 of the guide members 100 extend toward and slightly into the throat 102 formed between the presser rolls.

In operation, the machine of the present invention is drawn over the field behind the mowing machine, which cuts the alfalfa, and upon operation of the engine 8 the presser rolls 21, 22 and the reel 95 with the pick-up fingers 98 are rotated in the directions as indicated by arrows in Fig. 4. The pick-up fingers are so positioned with respect to the ground that they will pick up the mowed alfalfa plants from the field, and deposit the same upon the guide members 100 and shift the plants toward the presser rolls 21 and 22. The plants shifted toward the presser rolls are introduced between the same while the pick-up fingers 98 recede downwardly between the adjacent guide members 100 which strip the plants therefrom. The plants introduced between the presser rolls are gripped thereby, advanced therebetween and discharged at the rear end of the machine. The presser rolls are spaced with respect to each other in such a manner, and the pressure of the springs acting upon the roll 21 is regulated in such a way, that the stems of the plants are compressed and cracked as they pass between the presser rolls, thereby permitting air to enter into the stems through the cracks to accelerate the drying of the hay. It should further be noted that under these conditions the spacing between these presser rolls is such that the leafy portions of the plants are not broken from the stems so that the plants may be subsequently arranged in windrows and removed from the field after drying without any substantial loss of leafy portions thereof.

To maintain the presser rolls 21 and 22 clean and to remove any accumulation of plant material therefrom, spring-operated scraper blades 115 and 116 may be provided which extend longitudinally of the rolls at the discharge end of the machine and are movably mounted between the side plates 4 and 5 thereof. A cover plate 117, a portion of which has been shown in Fig. 1, may be secured to the side plate 5 to enclose the mechanism carried thereby.

The tops of the growing alfalfa are usually somewhat entangled and in order to separate the cut from the uncut plants as the machine is drawn over the swath behind the mower, a divider 118 is employed which is secured to the front end of the side plate 5.

To obtain a proper pick-up of the cut plants from the field it is necessary that the resilient fingers 98 be closely spaced with respect to the ground. This proper spacing of the fingers 98 is obtained by raising or lowering the point of connection of the draw bar 16 on the mowing machine (not shown).

During the operation of the machine, it sometimes happens that foreign matter such as corn stalks, corn cobs, or the like previously raised on the field are elevated by the pick-up fingers 98 and presented to the presser rolls 21 and 22. Such foreign material has a tendency to cause clogging of the rolls, and to effect the discharge thereof without stopping the machine, a mechanism has been provided for elevating the upper presser roll 21 so as to temporarily increase the spacing between the presser rolls and permit such foreign objects to pass therebetween.

The mechanism for elevating the upper presser roll 21 consists of the rotary cams 35 and 38 previously referred to, and cam-engaging hooks 120 and 121 (see Figs. 2, 3, 5 and 7). The rotary cams 35 and 38 are in the form of circular discs eccentrically mounted upon the stud shafts 23 and 24. The hooks 120 and 121 are pivotally mounted at 123 and 124 within supporting brackets 125 and 126 carried by the upper frame structure 2 and top wall 127 of the gear housing 6, respectively. A coil spring 128 secured at one end to the hook 120 and attached at its other end to a pin 129 on the side plate 5 is adapted to hold the hook 120 normally in inoperative position, as shown in Fig. 2. An abutment lug 130 which engages the lower side of the bracket 125 limits the outward movement of the hook 120. In a similar manner, the hook 121 is normally held in inoperative position by means of coil spring 135 attached at one end thereof to the same and secured with its other end by means of a pin 136 to the side plate 4. The outward movement of the hook 121 is limited by means of an abutment lug 137 thereof which engages the lower side of the bracket 126.

Actuating arms 140 and 141 fixed upon a transverse shaft 143 rotatably mounted within a bracket 144, bracket 126 and the side plate 4 adjacent the upper frame structure 2 are adapted to engage the hooks 120 and 121, respectively, and force the same toward the rotary cams 35 and 38 against the tension of the springs 128 and 135 upon rotation of the shaft 143. Fixed to the shaft 143 and extending through a slot 146 in the upper frame structure 2 of the machine is an actuating lever 147 to which a rope 148 may be attached and extended to the driver's seat on the mower behind which the machine is towed.

When it is desired to raise the upper presser roll 21 to increase the spacing between the rolls to permit the passage of foreign objects therebetween, it is only necessary to exert a pull upon the rope 148 whereby shaft 143 is rotated and the actuating arms 140 and 141 are moved in a corresponding direction against the hooks 120 and 121, swinging the same into engagement with the rotary cams 35 and 38.

The lower ends 150 and 151 of the hooks 120 and 121 are of a curved configuration corresponding to the circular shape of the cams 35 and 38, so that when the curved ends of the hooks 120 and 121 are brought into engagement with the rotary cams 35 and 38, respectively, they will receive a substantial section of the lower portions of the cams and extend beneath the same.

The position of the hooks with respect to the cams 35 and 38 and the direction of rotation of the latter being such that the high portions 152 of the cams have a tendency to pull the lower curved ends of the hooks thereteneath upon engagement therewith, while the low portions 153 of the cams provide sufficient clearance when they are adjacent the lower ends of the hooks to permit a proper engagement of the hooks with the cams upon actuation of the lever 147 and a subsequent disengagement thereof under the action of the springs 128 and 135.

Therefore, when the hooks 120 and 121 are engaged with the rotary cams 35 and 38 during the continuous rotation of the same the stud shafts 23 and 24, bearings 31 and 32 and the upper presser roll 21 are lifted in an upward direction against the tension of the springs 60 and 61 and subsequently lowered to their original position, due to the camming action between the high portions 152, the rotary cams and the lower ends of the hooks. Upon raising of the upper presser roll 21 the spacing between the presser rolls 21 and 22 is increased sufficiently (approximately 1 3/16 inches) to permit the passage of foreign objects therebetween.

A short pull on the rope 148 which will effect a single upward and downward movement of the upper presser roll 21 usually will be sufficient to discharge any foreign material from the machine. However, if desired, the hooks 120 and 121 may be held in engagement with the rotary cams 35 and 38 for a sufficient length of time to cause a continuous raising and lowering of the upper presser roll 21, i. e., a continuous reciprocation thereof, until any obstruction of the presser rolls caused by foreign matter or accumulation of large quantities of alfalfa in front of the presser rolls is removed.

As previously stated herein, it has been found impractical to employ contacting metal presser rolls because the same chew up the plants, and to cover one or both rolls with rubber also has not been satisfactory due to the expense and the fact that the pressure between the contacting rolls causes breaking of considerable amounts of leafy portions from the plants which, in view of their small size, cannot be subsequently recovered from the field. It has been found, however, that if metal rolls are employed and spaced with respect to each other in a manner as set forth herein, the stems of the plants will be properly cracked to accelerate the drying of the same while the leafy portions of the plants will freely pass between the rolls without being broken from the stems so that a better and more valuable alfalfa hay is obtained.

In view of the fact that the metal rolls employed in the machine of the present invention are spaced and do not contact each other it is not necessary to machine the surface of the same. These rolls may therefore be cheaply manufactured and the expense of upkeep of the same is negligible because the wear on the rolls is very slight and frequent replacements thereof as in the case of rubber-covered rolls are not necessary.

While I have described a particular embodiment of the present invention it will be understood that various changes and modifications may be made without departing from the spirit of the present invention and the scope of the appended claims.

Having thus described my invention, what I claim as new and desire to secure by Letters Patent is:

1. A machine for treating plants comprising a frame, a lower presser roll rotatably mounted within the frame, an upper presser roll, means for rotatably and yieldingly mounting the upper roll within the frame and for positioning the same in spaced and parallel relation with respect to the lower roll, rotary cams associated with the upper roll and fixed thereto for rotation therewith, means movably mounted on the frame for engagement with said cams, and means for rotating the rolls and said cams, whereby upon engagement of the movable means with the cams the spacing between the rolls is increased incident to the rotation thereof.

2. A machine for treating plants comprising a frame, a lower presser roll rotatably mounted within the frame, an upper presser roll, means for rotatably and yieldingly mounting the upper roll within the frame and for positioning the same in spaced and parallel relation with respect to the lower roll, rotary cams associated with the upper roll and fixed for rotation therewith, means movably mounted on the frame for engagement with said cams, means for rotating the rolls and said cams, and means for engaging said movable means with said cams for moving the upper roll away from said lower roll to increase the spacing between said rolls.

3. A machine for treating plants comprising a frame, a lower presser roll rotatably mounted within the frame, an upper presser roll vertically movable and rotatably mounted within the frame in parallel relation with respect to the lower roll, means for holding the rolls in predetermined spaced relation, means for rotating said rolls, a plurality of cams associated with the upper roll for rotation therewith, means pivotally mounted on the frame adjacent said cams and movable into and out of engagement with said cams for effecting raising of the upper roll upon rotation of said cams to increase the spacing between the rolls, and means for controlling the operation of said pivotally mounted means.

4. A machine for treating plants comprising a frame, cooperating presser rolls associated with said frame, means for yieldably mounting said rolls relative to each other, drive means for rotating the rolls, a rotary cam eccentrically mounted with respect to one of said rolls for rotation therewith, and cam engaging means movably mounted on said frame and engageable with said rotary cam for raising and lowering said roll during rotation thereof.

5. A machine for treating plants comprising a frame, cooperating presser rolls associated with said frame, drive means for rotating the rolls, a rotary cam eccentrically mounted with respect to one of said rolls for rotation therewith, and cam engaging means movably mounted on said frame and engageable with said rotary cam for raising and lowering said roll during rotation of the same.

RUSSELL H. REED.